(12) United States Patent
Lazaro et al.

(10) Patent No.: US 12,034,378 B2
(45) Date of Patent: *Jul. 9, 2024

(54) HYBRID MULTI-LEVEL INVERTER AND CHARGE PUMP

(71) Applicant: TEXAS INSTRUMENTS INCORPORATED, Dallas, TX (US)

(72) Inventors: Orlando Lazaro, Cary, NC (US); Yogesh Kumar Ramadass, San Jose, CA (US); Nan Xing, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,190

(22) Filed: Nov. 11, 2022

(65) Prior Publication Data
US 2023/0072847 A1  Mar. 9, 2023

Related U.S. Application Data

(63) Continuation of application No. 17/389,926, filed on Jul. 30, 2021, now Pat. No. 11,502,619.

(51) Int. Cl.
*H02M 7/483* (2007.01)
*H02M 3/07* (2006.01)
*H02M 1/00* (2006.01)

(52) U.S. Cl.
CPC ........... *H02M 7/4835* (2021.05); *H02M 3/07* (2013.01); *H02M 1/0095* (2021.05)

(58) Field of Classification Search
CPC .................................................. H02M 1/0095
See application file for complete search history.

(56) References Cited

U.S. PATENT DOCUMENTS

| | | | | |
|---|---|---|---|---|
| 5,199,429 A | * | 4/1993 | Kroll | A61N 1/3956 607/5 |
| 5,339,236 A | * | 8/1994 | Tamagawa | H02M 3/07 363/59 |
| 5,461,557 A | * | 10/1995 | Tamagawa | H03K 3/356121 363/60 |
| 5,596,489 A | * | 1/1997 | Bazes | H02M 3/07 363/62 |
| 5,610,807 A | * | 3/1997 | Kanda | H02M 7/497 363/43 |
| 5,635,776 A | * | 6/1997 | Imi | H02M 3/07 307/108 |

(Continued)

*Primary Examiner* — Yusef A Ahmed
(74) *Attorney, Agent, or Firm* — Ming Wai Choy; Frank D. Cimino

(57) ABSTRACT

A method includes charging a capacitor of a power inverter to a direct current (DC) input voltage from an input terminal of the power inverter. The capacitor has first and second terminals. The method also includes providing a first voltage at an output terminal of the power inverter at a first time by controlling one of either: an output switch that selectively couples the output terminal to either the first terminal or the second terminal; or a set of input switches that selectively couple the first and second terminals to either the input terminal or a ground terminal. The method further includes providing a second voltage at the output terminal at a second time by controlling the other of the output switch or the set of input switches.

25 Claims, 8 Drawing Sheets

(56) References Cited

U.S. PATENT DOCUMENTS

| | | | | |
|---|---|---|---|---|
| 5,726,870 A * | 3/1998 | Lavieville | ........... | H02M 7/4837 363/62 |
| 5,994,949 A * | 11/1999 | Menichelli | ........... | H02M 3/073 363/60 |
| 6,184,594 B1 * | 2/2001 | Kushnarenko | ........ | H02M 3/073 363/60 |
| 6,278,318 B1 * | 8/2001 | Watanabe | ............... | H02M 3/07 327/536 |
| 6,288,458 B1 * | 9/2001 | Berndt | .................... | H02M 3/07 307/130 |
| 6,456,123 B1 * | 9/2002 | Oakeson | ................ | H03K 5/249 327/91 |
| 6,927,441 B2 * | 8/2005 | Pappalardo | ............. | H02M 3/07 257/299 |
| 7,786,917 B2 * | 8/2010 | Hu | ......................... | H03M 1/68 341/172 |
| 8,358,520 B2 | 1/2013 | Shvartsman | | |
| 8,681,522 B2 * | 3/2014 | Hallak | .................... | H02M 7/48 363/95 |
| 8,922,270 B2 * | 12/2014 | Liu | ......................... | H02M 3/07 327/536 |
| 9,559,589 B2 * | 1/2017 | Petersen | ................ | H05B 45/38 |
| 10,003,261 B2 * | 6/2018 | Petersen | ................ | H02M 3/07 |
| 10,027,223 B1 * | 7/2018 | Zhang | ................... | H02M 3/07 |
| 10,211,726 B1 * | 2/2019 | Genest | ................... | H02M 3/07 |
| 10,236,770 B1 * | 3/2019 | Ker | .................... | H03K 17/6871 |
| 10,263,514 B1 * | 4/2019 | Aboueldahab | ...... | H02M 3/1582 |
| 11,121,643 B1 * | 9/2021 | Rawa | ................... | H02M 1/0095 |
| 11,146,170 B2 * | 10/2021 | Xiong | .................... | H02M 3/07 |
| 11,211,861 B2 * | 12/2021 | Giuliano | .................. | H02M 7/25 |
| 11,463,006 B2 * | 10/2022 | Cannillo | ............... | H02M 1/0048 |
| 2005/0083106 A1 * | 4/2005 | Hazucha | ............... | H02M 3/073 327/337 |
| 2005/0213356 A1 * | 9/2005 | Yanagida | ............... | H02M 3/07 363/59 |
| 2006/0028849 A1 * | 2/2006 | Ogata | .................... | H02M 3/07 363/59 |
| 2006/0250177 A1 * | 11/2006 | Thorp | .................. | H02M 3/073 327/536 |
| 2007/0211503 A1 * | 9/2007 | Oyama | .................. | H02M 3/07 363/62 |
| 2007/0279021 A1 * | 12/2007 | Yanagida | .............. | H02M 3/07 323/272 |
| 2008/0116966 A1 * | 5/2008 | Chae | .................... | H03M 3/356 327/554 |
| 2008/0266917 A1 * | 10/2008 | Lin | ........................ | H02M 3/07 363/80 |
| 2009/0278520 A1 * | 11/2009 | Perreault | ................ | H02M 3/07 323/282 |
| 2010/0117727 A1 * | 5/2010 | Dawson | .................. | H03F 3/602 330/124 R |
| 2011/0050326 A1 * | 3/2011 | Cook | ...................... | H02M 3/07 327/536 |
| 2011/0062940 A1 * | 3/2011 | Shvartsman | ............ | H02M 3/07 323/351 |
| 2012/0001683 A1 * | 1/2012 | Wang | ........................ | G05F 3/02 327/536 |
| 2012/0112724 A1 * | 5/2012 | Nishida | ................... | H02M 3/07 323/293 |
| 2012/0200340 A1 * | 8/2012 | Shook | .................... | H02M 3/07 327/536 |
| 2012/0293254 A1 * | 11/2012 | Liu | .......................... | G05F 1/46 323/283 |
| 2013/0076145 A1 * | 3/2013 | Kim | ...................... | H02J 7/0063 307/77 |
| 2013/0194247 A1 * | 8/2013 | Onoue | ................... | G09G 3/344 345/107 |
| 2013/0328597 A1 * | 12/2013 | Cassia | .................... | H02M 3/07 327/299 |
| 2014/0022005 A1 * | 1/2014 | Ramanan | ............... | H02M 3/07 327/536 |
| 2014/0043010 A1 * | 2/2014 | Salem | ................. | H02M 7/4835 323/311 |
| 2014/0125412 A1 * | 5/2014 | Dawson | .................. | H03F 3/602 330/251 |
| 2015/0035513 A1 * | 2/2015 | Hinrichs | .................. | G05F 1/561 323/313 |
| 2015/0171768 A1 * | 6/2015 | Perreault | ............... | H02M 7/537 330/251 |
| 2015/0263612 A1 * | 9/2015 | Wu | ........................ | H02M 3/07 323/312 |
| 2016/0094126 A1 * | 3/2016 | Liu | .......................... | H03K 7/06 455/73 |
| 2016/0094214 A1 * | 3/2016 | Liu | ...................... | H03K 17/005 327/113 |
| 2018/0026528 A1 * | 1/2018 | Xiong | .................... | H02M 3/07 323/312 |
| 2019/0190376 A1 * | 6/2019 | Xiong | ..................... | H02M 7/12 |
| 2021/0218342 A1 * | 7/2021 | Zmood | ............... | H02M 7/5387 |
| 2022/0014098 A1 * | 1/2022 | Xie | ........................ | H03K 19/20 |
| 2022/0103058 A1 * | 3/2022 | Atias | ........................ | H02J 5/00 |
| 2022/0103066 A1 * | 3/2022 | Chen | ...................... | H02M 3/04 |
| 2022/0115947 A1 * | 4/2022 | Huh | ...................... | H02M 3/1582 |
| 2022/0182065 A1 * | 6/2022 | Wu | .......................... | H03K 5/24 |

* cited by examiner

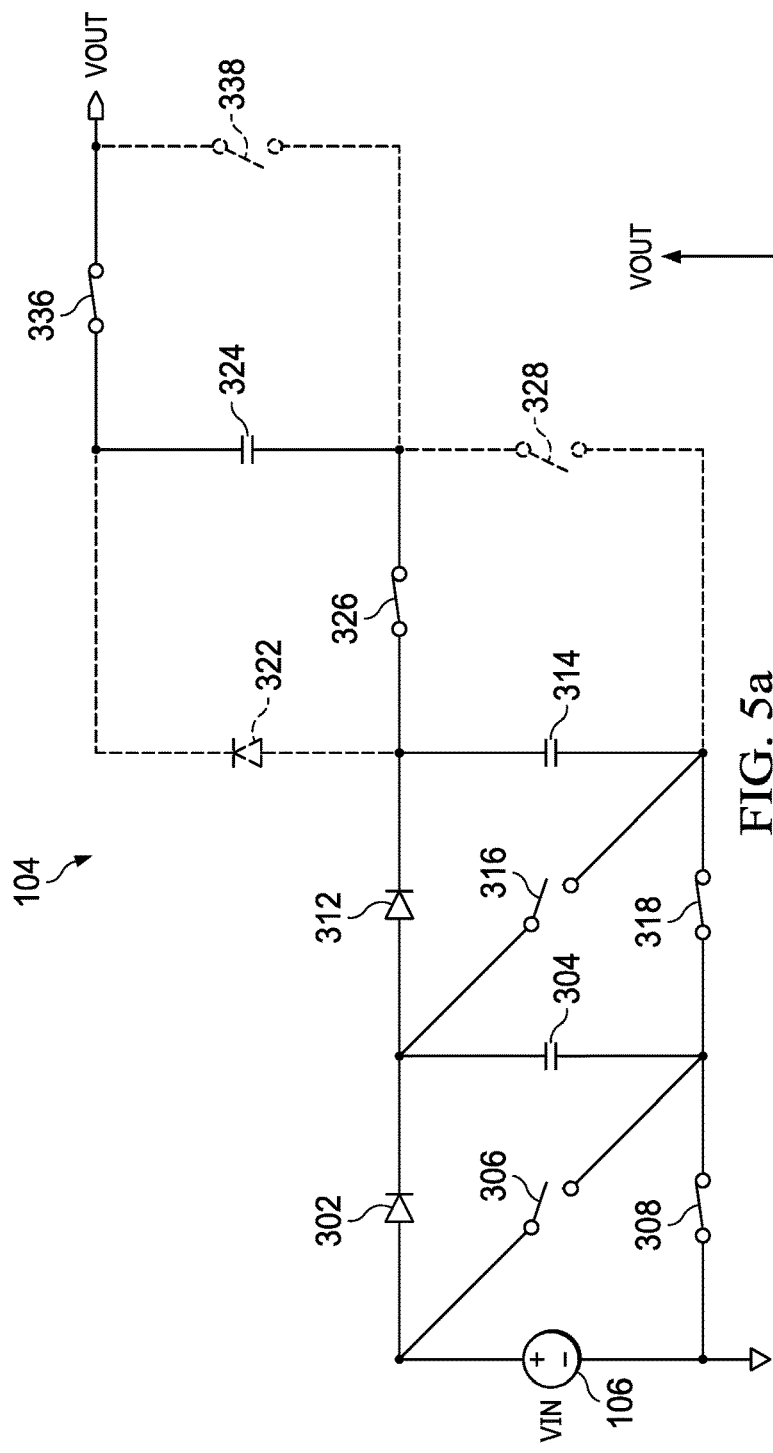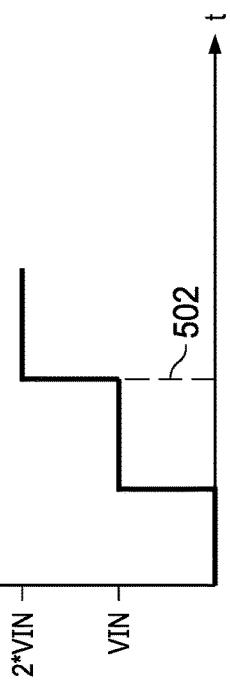
FIG. 5a
FIG. 5b

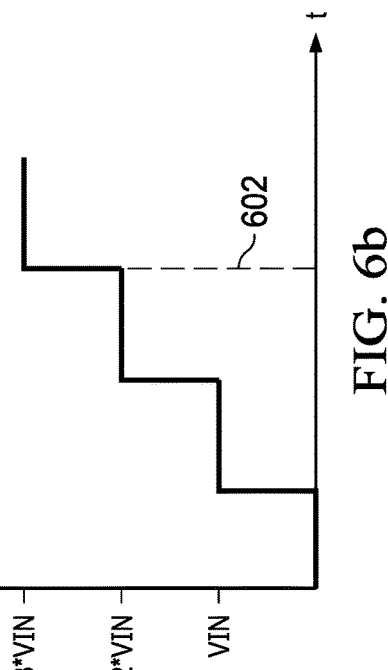
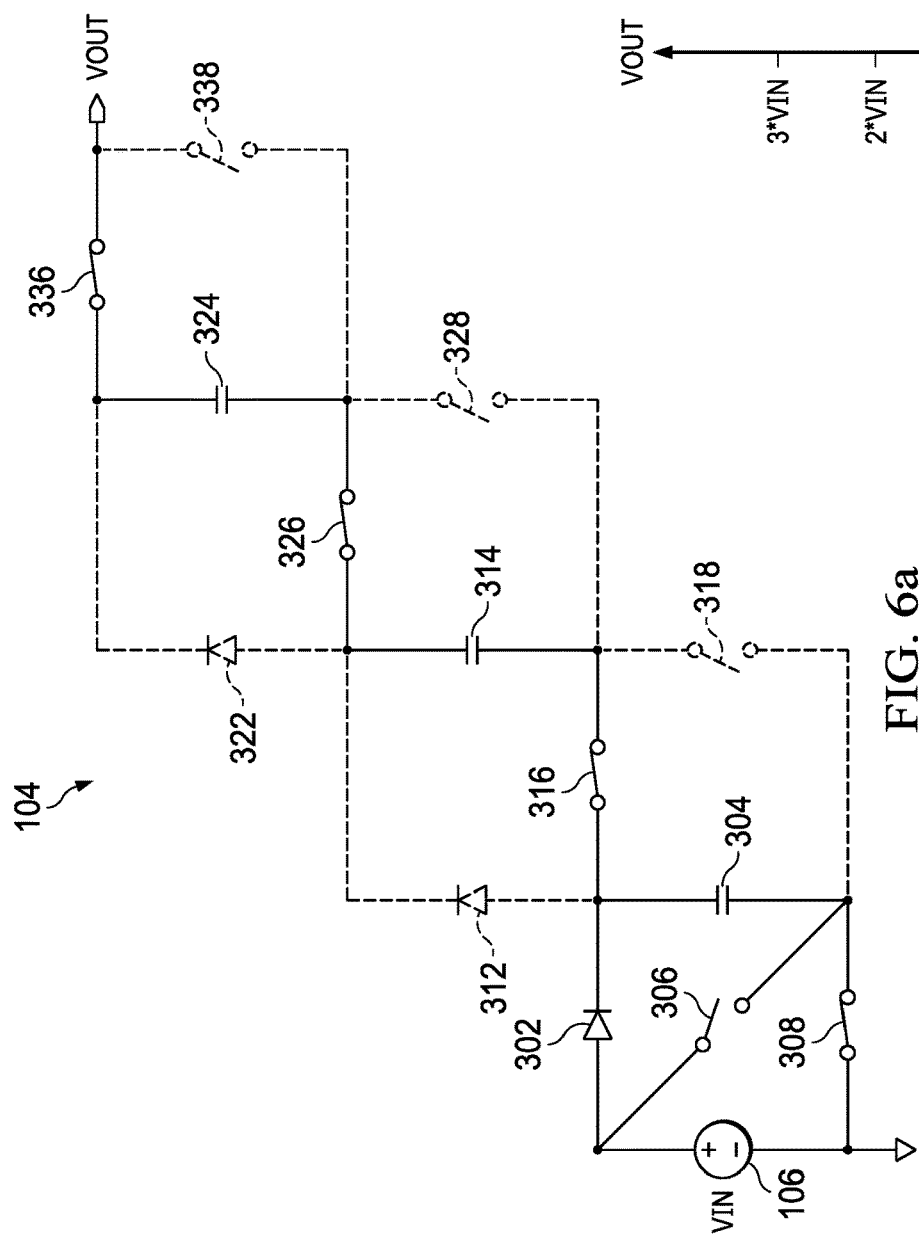

HYBRID MULTI-LEVEL INVERTER AND CHARGE PUMP

CROSS-REFERENCE TO RELATED APPLICATIONS

This application is a continuation of U.S. patent application Ser. No. 17/389,926 filed Jul. 30, 2021, which is hereby incorporated herein by reference.

BACKGROUND

A power inverter is a device that receives a direct current (DC) input voltage and provides an alternating current (AC) output voltage (e.g., to a load) responsive to the DC input voltage.

SUMMARY

In an example of the description, a method includes charging a capacitor of a power inverter to a direct current (DC) input voltage from an input terminal of the power inverter. The capacitor has first and second terminals. The method also includes providing a first voltage at an output terminal of the power inverter at a first time by controlling one of either: an output switch that selectively couples the output terminal to either the first terminal or the second terminal; or a set of input switches that selectively couple the first and second terminals to either the input terminal or a ground terminal. The method further includes providing a second voltage at the output terminal at a second time by controlling the other of the output switch or the set of input switches.

In another example of the description, a device includes a power inverter including an input terminal, an output terminal, a ground terminal, a capacitor having first and second terminals, a set of input switches configured to selectively couple the first and second terminals to either the input terminal or the ground terminal, and an output switch configured to selectively couple the output terminal to either the first terminal or the second terminal. The device also includes a controller coupled to the power inverter. The controller is configured to control the set of input switches to charge the capacitor to a direct current (DC) input voltage from the input terminal. At a first time, the controller is configured to control one of either the output switch or the set of input switches to provide a first voltage to the output terminal. At a second time, the controller is configured to control the other of the output switch or the set of input switches to provide a second voltage to the output terminal.

In yet another example of the description, a device includes a first supply terminal adapted to be coupled to an input voltage source and a second supply terminal adapted to be coupled to a ground terminal, first and second load terminals adapted to be coupled to a load, an output switch configured to selectively couple one of the first and second load terminals to the load, and a unit cell network coupled to each of the supply terminals and the load terminals. The unit cell network includes a step-up unit cell, which includes first and second input terminals; first and second output terminals; a first capacitor coupled between the first and second output terminals; a first single-pole, single-throw (SPST) switch configured to selectively couple the first output terminal to the first input terminal; and a first single-pole, double-throw (SPDT) switch configured to selectively couple the second output terminal to either the first input terminal or the second input terminal. The unit cell network also includes a step-down unit cell, which includes third and fourth input terminals; third and fourth output terminals; a second capacitor coupled between the third and fourth output terminals; a second SPDT switch configured to selectively couple the third output terminal to either the third input terminal or the fourth input terminal; and a second SPST switch configured to selectively couple the fourth output terminal to the fourth input terminal.

BRIEF DESCRIPTION OF THE DRAWINGS

FIG. 5a is a circuit diagram of the multi-level power inverter of FIG. 3a in a third configuration at a third time, and FIG. 5b is a timing diagram of the output voltage of the power inverter through the third time, in an example.

FIG. 6a is a circuit diagram of the multi-level power inverter of FIG. 3a in a fourth configuration at a fourth time, and FIG. 6b is a timing diagram of the output voltage of the power inverter through the fourth time, in an example.

DETAILED DESCRIPTION

Figure 1:
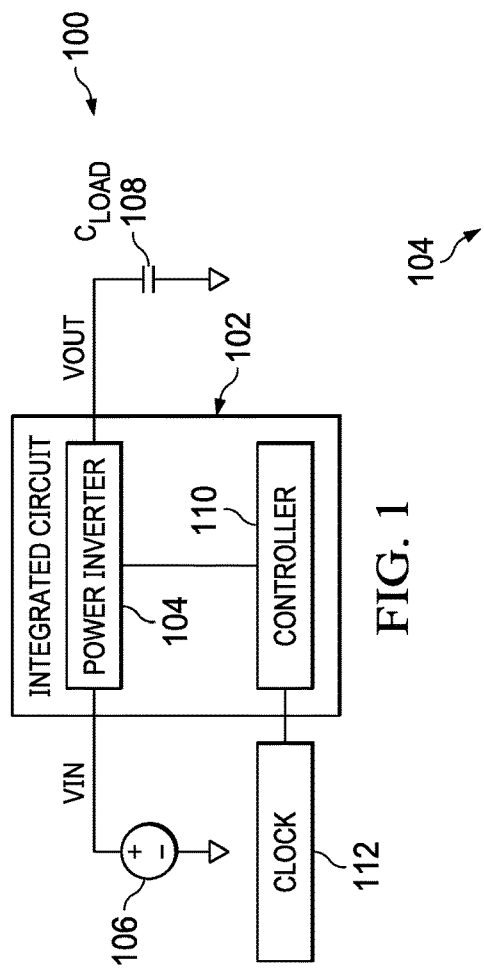
FIG. 1 is a block diagram of a system including a multi-level power inverter in an example.

Implementing a power inverter on an integrated circuit that drives parasitic capacitance while providing acceptable efficiency is difficult. In the case of an H-bridge inverter, hard charging and discharging of parasitic capacitance on the switching nodes consumes energy, which reduces the efficiency of the inverter and limits its maximum power output. In another case of a resonant drive inverter, a series inductor is useful to resonantly charge and discharge the parasitic capacitance while providing a Q-boosted sinusoidal output voltage waveform. However, while the resonant drive inverter reduces driver losses relative to the H-bridge inverter, on-chip inductors have poor Q-factors (e.g., Q<5) at lower frequencies (e.g., <200 MHz) and occupy relatively large area (e.g., approximately 1×1 $mm^2$). In yet another case of a multi-level charge pump inverter, driver losses are reduced by providing a multi-step output voltage waveform. However, switches that couple the various charge pump outputs to the load should be capable of bidirectional blocking, which demands more robust transistors and increases the complexity of driving the gates of those transistors.

Examples of this description include a power inverter and a method for operating the power inverter, which may be implemented on an integrated circuit (IC) while providing acceptable efficiency for various applications. In particular, the power inverter described herein includes one or more step-up and/or step-down unit cells that are configured to provide an AC output voltage responsive to a DC input voltage. The unit cells are charged to the DC input voltage. As described below, a step-up unit cell is configured to provide its voltage to an output of the power inverter as a positive voltage, while a step-down unit cell is configured to provide its voltage to the output as a negative voltage. In some examples, the power inverter described herein, as well as a method of controlling the power inverter, results in a quasi-adiabatic process, in which energy is relatively gradually (e.g., in a stepped manner) transferred to a capacitive load, which increases the efficiency of the power inverter and reduces intrinsic losses related to charging the capacitive load. In these examples, the quasi-adiabatic process is not necessarily lossless, but rather reflects adiabatic principles of operation.

The power inverter includes an input terminal that is adapted to be coupled to a DC input voltage source, such as an automotive battery or other DC voltage source. The input terminal is configured to receive a DC input voltage from the DC input voltage source. The power inverter also includes an output terminal that is adapted to be coupled to a load. The output terminal is configured to provide an AC output voltage, responsive to the DC input voltage, to the load.

The power inverter also includes at least one capacitor and a set of input switches (e.g., transistors) coupled to the (or each) capacitor. The set of input switches is configured to selectively couple first and second terminals of the capacitor to either the input terminal or a ground terminal. The power inverter also includes an output switch that is configured to selectively couple the output terminal to either the first or second terminal of the capacitor. The capacitor is charged to the DC input voltage. For example, the input switches are controlled to couple the first terminal of the capacitor to the input terminal and the second terminal of the capacitor to the ground terminal, which arranges the capacitor in parallel with the input voltage source and charges the capacitor to the DC input voltage. In this example, the output switch is controlled to couple the output terminal to the second terminal, which is coupled to the ground terminal at this time.

At a first time, one of either the output switch or the set of input switches is controlled to provide a first voltage to the output terminal. At a second time, the other of the output switch or the set of input switches is controlled to provide a second voltage to the output terminal. For example, if the set of input switches is controlled or operated at the first time, then the output switch is controlled or operated at the second time. Alternately, if the output switch is controlled or operated at the first time, then the set of input switches is controlled or operated at the second time.

In one example, the input switches are controlled at the first time to couple the second terminal of the capacitor to the input terminal (e.g., rather than ground). Accordingly, the power inverter provides the input voltage (e.g., the first voltage) to the output terminal at the first time. Continuing this example, the output switch is controlled at the second time to couple the output terminal to the first terminal (e.g., rather than the second terminal). The second terminal is coupled to the input terminal as described above, and thus the capacitor is arranged in series between the input terminal and the output terminal. Accordingly, the power inverter provides the voltage across the capacitor plus the input voltage (e.g., the sum being the second voltage) to the output terminal at the second time. The foregoing is one example and, as described further below, different permutations exist to provide the first voltage (and second, or additional voltages) to the output terminal or load. Examples described herein are not limited to a particular control permutation to provide a particular voltage unless explicitly stated.

In some examples, the capacitor and the set of input switches are configured as a step-up unit cell. In other examples, the capacitor and the set of input switches are configured as a step-down unit cell. In still other examples, the power inverter includes additional capacitor(s) and set(s) of input switches coupled to each capacitor, which are configured as step-up unit cell(s), step-down unit cell(s), or combinations thereof. Irrespective of the particular configuration, the power inverter provides the AC output voltage in a quasi-adiabatic manner, which increases the efficiency of the power inverter and reduces intrinsic losses related to charging the capacitive load. These examples are described below with reference to the accompanying figures.

FIG. 1 is a block diagram of a system 100 in an example of this description. The system 100 includes an integrated circuit 102. The integrated circuit 102 includes a power inverter 104. The power inverter 104 has an input terminal adapted to be coupled to an input voltage source 106. The input voltage source 106 is an automotive battery in one example. The input voltage source 106 provides a DC input voltage (VIN). Accordingly, the power inverter 104 is configured to receive VIN from the input voltage source 106.

The power inverter 104 also has an output terminal adapted to be coupled to a load 108, which is represented as a capacitor 108 (having capacitance CLOAD) in FIG. 1. The load 108 is configured to receive an AC output voltage (VOUT). Accordingly, the power inverter 104 is configured to provide VOUT to the load 108.

The integrated circuit 102 also includes a controller 110 coupled to the power inverter 104. The controller 110 is configured to control the operation of the power inverter 104. For example, the controller 110 controls the operation of set(s) of input switches of step-up and/or step-down unit cells of the power inverter 104, described below. In the example of FIG. 1, the controller 110 is coupled to a clock signal generator 112. Accordingly, the controller 110 is configured to control the power inverter 104 in a synchronous manner. For example, the controller 110 controls the power inverter 104 to provide varying output voltages as a function of time to achieve an effective AC output voltage at a particular frequency.

Figure 2:
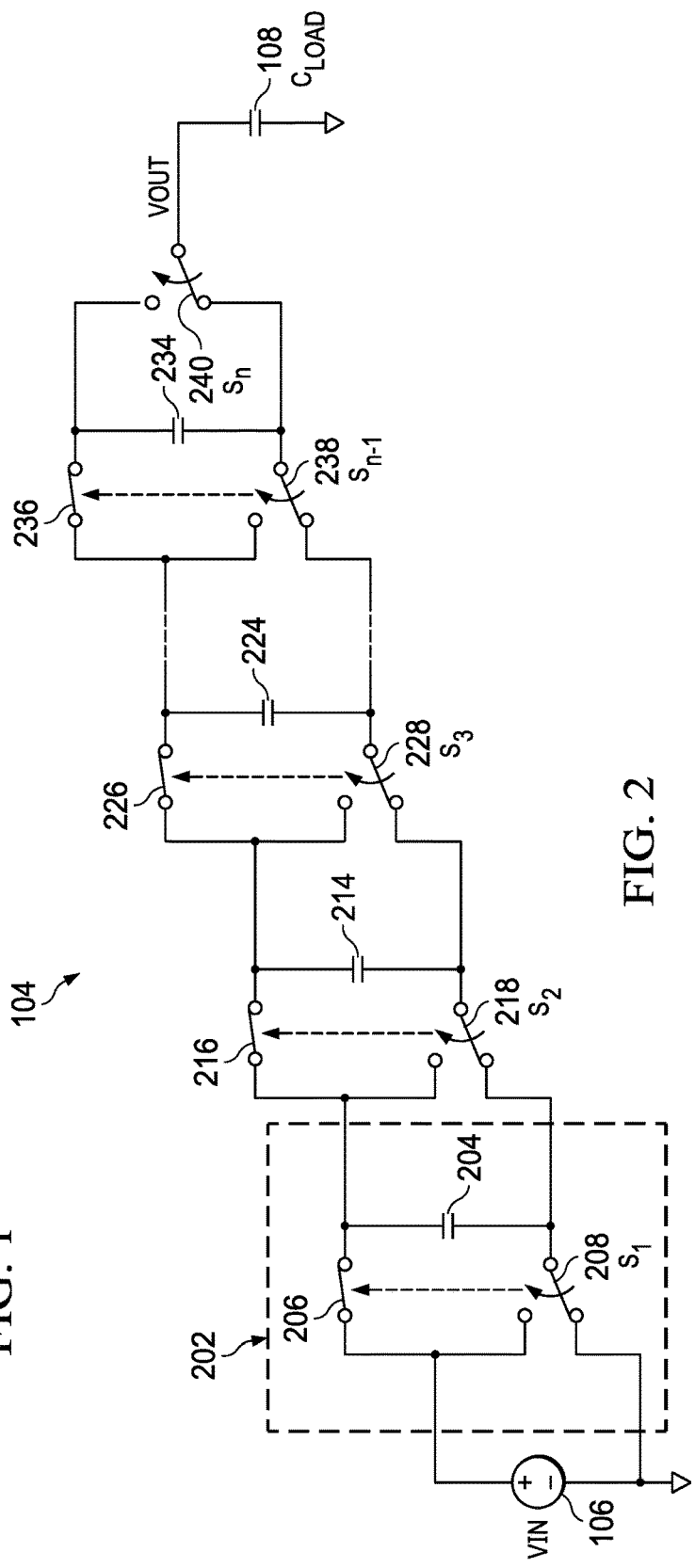
FIG. 2 is a circuit diagram of a multi-level power inverter in an example.

FIG. 2 is a circuit diagram of the power inverter 104 of FIG. 1 in further detail. In the example of FIG. 2, the power inverter 104 includes multiple step-up unit cells. Each step-up unit cell includes a set of input switches and a capacitor. In the specific example of FIG. 2, the power inverter 104 includes n−1 such step-up unit cells, and four such step-up unit cells are shown. However, in other examples, the power inverter 104 includes more or fewer such unit cells.

In the example of FIG. 2, a first step-up unit cell 202 includes a capacitor 204 and a set of input switches 206, 208. For convenience, capacitors are referred to herein as having a "top plate" and a "bottom plate," which refer to the corresponding terminals of the capacitor in the direction of the figure. For example, a top plate of capacitor 204 is coupled to the switch 206, while a bottom plate of capacitor 204 is coupled to the switch 208. The input switches 206, 208 are controlled by a signal S1, and operate in a synchronized manner (e.g., due to being controlled by the same signal S1).

In FIG. 2, the power inverter 104 also includes a second step-up unit cell including capacitor 214 and input switches 216, 218; a third step-up unit cell including capacitor 224 and input switches 226, 228; and a fourth step-up unit cell including capacitor 234 and input switches 236, 238. The input switches 216, 218 are controlled by a signal S2; the input switches 226, 228 are controlled by a signal S3; and the input switches 236, 238 are controlled by a signal Sn−1. In an example, the signals S1, S2, S3, . . . , Sn−1 are binary signals that are provided by the controller 110 to the power inverter 104.

In certain examples described herein, the various input switches, with input switches 206, 208 being examples, are implemented as single-pole, single-throw (SPST) or single-pole, double-throw (SPDT) switches. For example, the switch 206, along with switches 216, 226, 236, are SPST switches, and the switch 208, along with switches 218, 228, 238 are SPDT switches. However, the various input switches, of which the input switches 206, 208 are examples, can include different structures to provide the functionality described herein.

In FIG. 2, the example input switches 206, 208 are in a first position (e.g., responsive to S1 being a first value), in which the switch 206 couples the top plate of capacitor 204 to the input voltage source 106, and the switch 208 couples the bottom plate of capacitor 204 to ground. Similarly, the input switches 216, 218 are in a first position (e.g., responsive to S2 being a first value), in which the switch 216 couples the top plate of capacitor 214 to the input voltage source 106, and the switch 218 couples the bottom plate of the capacitor 214 to ground. The input switches 226, 228 are also in a first position (e.g., responsive to S3 being a first value), in which the switch 226 couples the top plate of capacitor 224 to the input voltage source 106, and the switch 228 couples the bottom plate of the capacitor 224 to ground. The input switches 236, 238 are in a first position (e.g., responsive to Sn−1 being a first value), in which the switch 236 couples the top plate of capacitor 234 to the input voltage source 106, and the switch 238 couples the bottom plate of the capacitor 234 to ground. An output switch 240 is controllable to couple either the top plate of the capacitor 234 or the bottom plate of the capacitor 234 to the load 108. Accordingly, in this example, the output switch 240 is a SPDT switch. The output switch 240 is controlled by a signal Sn. In an example, the signal Sn is a binary signal that is provided by the controller 110 to the power inverter 104.

Responsive to the input switches 206, 208, 216, 218, 226, 228, 236, 238 being in the first position (e.g., responsive to the signals S1 to Sn−1 being a first value, such as logic low), each of the capacitors 204, 214, 224, 234 is arranged in parallel with the input voltage source 106, and thus is charged to VIN. Responsive to the output switch 240 being in a first position (e.g., responsive to the signal Sn being a first value, such as logic low), the load 108 is coupled to ground and VOUT is at a ground voltage potential (e.g., 0V).

Subsequently (e.g., at a first time), one of either the output switch 240 or the sets of input switches is controlled (e.g., by the controller 110) to transition to a second position to change (e.g., increase in the example of FIG. 2) the voltage VOUT provided to the load 108.

In one example, the controller 110 alters the value of Sn at the first time (e.g., to be a second value, such as logic high) to cause the output switch 240 to couple the top plate of capacitor 234 (as well as the top plates of capacitors 224, 214, 204) to the load 108. Altering the value of Sn in this way causes the power inverter 104 to provide the voltage across capacitor 234 (e.g., VIN) to the load 108 through the output switch 240.

In another example, the controller 110 alters the value of Sn−1 at the first time (e.g., to be a second value, such as logic high) to cause the input switches 236, 238 to transition to a second position, in which the SPDT switch 238 couples the bottom plate of capacitor 234 to the top plate of capacitor 224 (as well as the top plates of capacitors 214, 204). In the second position, the SPST switch 236 is open. Altering the value of Sn−1 in this way causes the power inverter 104 to provide the voltage across capacitor 224 (e.g., VIN) to the load 108 through the switch 238 and the output switch 240.

In yet another example, the controller 110 alters the value of S3 at the first time (e.g., to be a second value, such as logic high) to cause the input switches 226, 228 to transition to a second position, in which the SPDT switch 228 couples the bottom plate of capacitor 224 (as well as the bottom plate of capacitor 234) to the top plate of capacitor 214 (as well as the top plate of capacitor 204). In the second position, the SPST switch 226 is open. Altering the value of S3 in this way causes the power inverter 104 to provide the voltage across capacitor 214 (e.g., VIN) to the load 108 through the switch 228, the switch 238, and the output switch 240.

In still another example, the controller 110 alters the value of S2 at the first time (e.g., to be a second value, such as logic high) to cause the input switches 216, 218 to transition to a second position, in which the SPDT switch 218 couples the bottom plate of capacitor 214 (as well as the bottom plates of capacitors 224, 234) to the top plate of capacitor 204. In the second position, the SPST switch 216 is open. Altering the value of S2 in this way causes the power inverter 104 to provide the voltage across capacitor 204 (e.g., VIN) to the load 108 through the switch 218, the switch 228, the switch 238, and the output switch 240.

In a further example, the controller 110 alters the value of S1 at the first time (e.g., to be a second value, such as logic high) to cause the input switches 206, 208 to transition to a second position, in which the SPDT switch 208 couples the bottom plate of capacitor 204 (as well as the bottom plates of capacitors 214, 224, 234) to the input voltage source 106. In the second position, the SPST switch 206 is open. Altering the value of S1 in this way causes the power inverter 104 to provide VIN to the load 108 through the switch 208, the switch 218, the switch 228, the switch 238, and the output switch 240.

As demonstrated above, multiple permutations exist to provide the first voltage (e.g., VIN) to the load 108. Examples described herein are not limited to a particular control permutation to provide a particular voltage unless explicitly stated. Accordingly, the controller 110 and the power inverter 104 are configured to provide various voltage levels to the load 108 based on a variety of different control permutations.

Subsequent to the first time (e.g., at a second time), one of the sets of input switches that was not altered at the first time, or the output switch 240 if not altered at the first time, is controlled (e.g., by the controller 110) to again change (e.g., increase in the example of FIG. 2) the voltage VOUT provided to the load 108. In the following examples of power inverter 104 and controller 110 behavior at the second time, the controller 110 altered the value of Sn−1 at the first time to cause the power inverter 104 to provide the voltage across capacitor 224 (e.g., VIN) to the load 108 through the switch 238 and the output switch 240.

In one example, the controller 110 alters the value of Sn at the second time to cause the output switch 240 to couple the top plate of capacitor 234 to the load 108. Because the bottom plate of capacitor 234 is coupled to the top plate of capacitor 224 due to the previous operation of switch 238 (and switch 236) at the first time, altering the value of Sn in this way causes the power inverter 104 to provide the voltage across capacitors 224, 234 (e.g., 2*VIN) to the load 108 through the output switch 240.

In another example, the controller 110 alters the value of S3 at the second time to cause the input switches 226, 228 to couple the bottom plate of capacitor 224 to the top plate of capacitor 214 (as well as the top plate of capacitor 204). Because the bottom plate of capacitor 234 is coupled to the top place of capacitor 224 due to the previous operation of switch 238 (and switch 236) at the first time, altering the value of S3 in this way causes the power inverter 104 to provide the voltage across capacitors 214, 224 (e.g., 2*VIN) to the load 108 through the switch 228, the switch 238, and the output switch 240.

In yet another example, the controller 110 alters the value of S2 at the second time to cause the input switches 216, 218 to couple the bottom plate of capacitor 214 (as well as the bottom plate of capacitor 224) to the top plate of capacitor 204. Because the bottom plate of capacitor 234 is coupled to the top plate of capacitor 224 due to the previous operation of switch 238 (and switch 236) at the first time, altering the value of S2 in this way causes the power inverter 104 to provide the voltage across capacitors 204, 224 (e.g., 2*VIN) to the load 108 through the switch 218, the switch 228, the switch 238, and the output switch 240.

In still another example, the controller 110 alters the value of S1 at the second time to cause the input switches 206, 208 to couple the bottom plate of capacitor 204 (as well as the bottom plates of capacitors 214, 224) to the input voltage source 106. Because the bottom plate of capacitor 234 is coupled to the top plate of capacitor 224 due to the previous operation of switch 238 (and switch 236) at the first time, altering the value of S1 in this way causes the power inverter 104 to provide VIN from the input voltage source 106 plus the voltage across capacitor 224 (e.g., 2*VIN total) to the load 108 through the switch 208, the switch 218, the switch 228, the switch 238, and the output switch 240.

As demonstrated above, multiple permutations exist to provide the second voltage (e.g., 2*VIN) to the load 108. Examples described herein are not limited to a particular control permutation to provide a particular voltage unless explicitly stated. Accordingly, the controller 110 and the power inverter 104 are configured to provide various voltage levels to the load 108 based on a variety of different control permutations.

In the specific example of FIG. 2, in which the power inverter 104 includes four shown capacitors 204, 214, 224, 234, the power inverter 104 is configured to provide VOUT having values including ground voltage potential (e.g., 0V), VIN, 2*VIN, . . . 5*VIN (e.g., VIN provided by the input voltage source 106 plus 4*VIN across the four capacitors 204, 214, 224, 234 in series). For example, VOUT is equal to VIN times the number of signals S1 to Sn that are logic high. Irrespective of the particular control permutation, the power inverter 104 of FIG. 2 is thus configured to provide VOUT as an AC output voltage responsive to VIN provided by the input voltage source 106 as a DC input voltage. Also, the power inverter 104 combines charge pump characteristics, such as to achieve a VOUT range that is greater than VIN, with quasi-adiabatic switching behavior to transfer energy relatively gradually (e.g., in a stepped manner) to the load 108. This increases the efficiency of the power inverter 104 and reduces intrinsic losses related to charging the capacitive load 108.

Figure 3A:
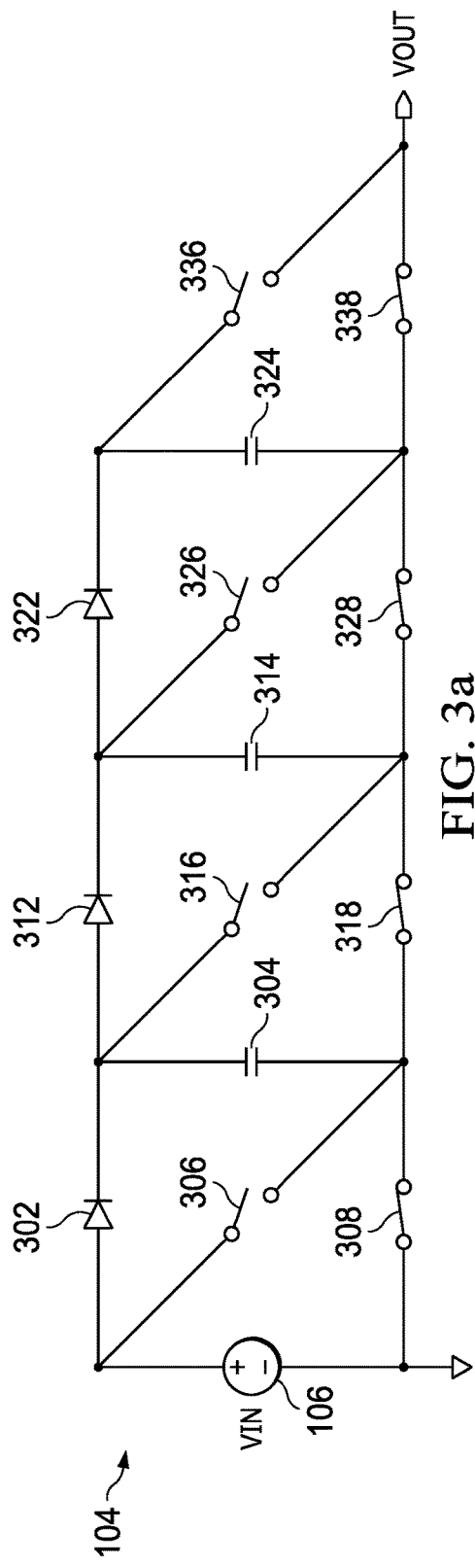
FIG. 3a is a circuit diagram of a multi-level power inverter in a first configuration at a first time.

FIGS. 3a-7a are circuit diagrams of the power inverter 104 in various configurations as a function of time. FIGS. 3b-7b are timing diagrams of the output voltage VOUT of the power inverter 104 as a function of time, corresponding to the configurations shown in FIGS. 3a-7a, respectively. The structure of the power inverter 104 in FIG. 3a is similar to that shown in FIG. 2, although simplified for ease of description.

For example, in FIG. 3a, the power inverter 104 includes one fewer capacitor, with capacitor 304 corresponding to capacitor 204, capacitor 314 corresponding to capacitor 214, and capacitor 324 corresponding to capacitor 234. The functionality of the SPDT switch 208 (e.g., coupling the bottom plate of capacitor 204 to either the input voltage source 106 or ground) is replaced in FIG. 3a with switches 306, 308, which are complementary and operate to couple the bottom plate of capacitor 304 to either the input voltage source 106 (responsive to switch 306 conducting) or ground (responsive to switch 308 conducting). Similarly, the functionality of the switch 218 is replaced in FIG. 3a with switches 316, 318; the functionality of the switch 238 is replaced in FIG. 3a with switches 326, 328; and the functionality of the output switch 240 is replaced in FIG. 3a with switches 336, 338. The functionality of the switch 206 (e.g., allowing capacitor 204 to be charged by the input voltage source 106 and preventing the capacitor 204 from discharging other than to the load 108) is replaced in FIG. 3a with blocking diode 302. Similarly, the functionality of the switch 216 is replaced in FIG. 3a with blocking diode 312, and the functionality of the switch 236 is replaced in FIG. 3a with blocking diode 322.

Figure 3B:
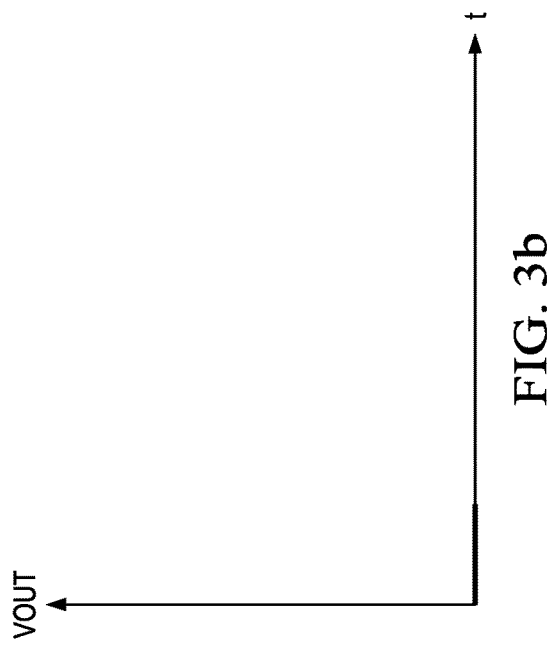
FIG. 3b is a timing diagram of an output voltage of the power inverter through the first time, in an example.

In FIG. 3a, the switches 308, 318, 328, 338 are conducting, and thus the switches 306, 316, 326, 336 are not conducting. Accordingly, VOUT is equal to a ground voltage potential (e.g., 0V) as shown in FIG. 3b.

Figure 4A:
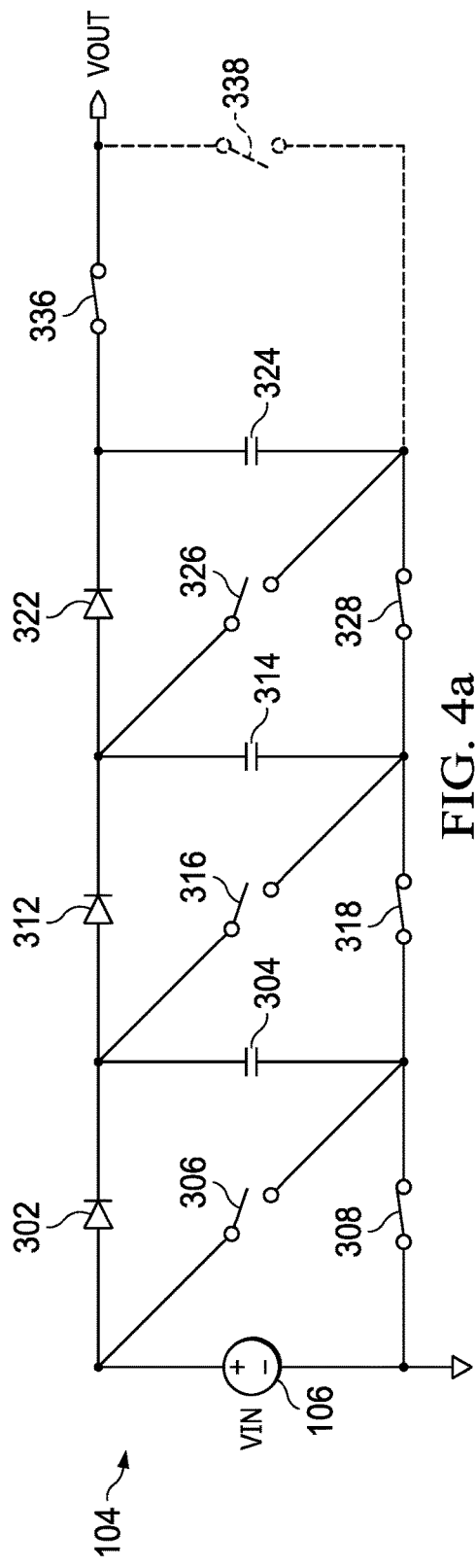
FIG. 4a is a circuit diagram of the multi-level power inverter of FIG. 3a in a second configuration at a second time.
Figure 4B:
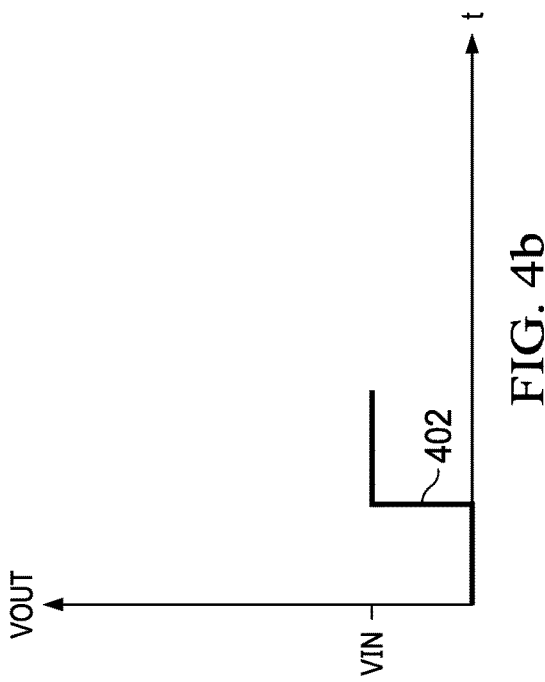
FIG. 4b is a timing diagram of the output voltage of the power inverter through the second time, in an example.

FIG. 4a represents a configuration of the power inverter 104 at a first time 402. The configuration shown in FIG. 4a differs relative to that in FIG. 3a in that the switch 336 is conducting and the switch 338 is not conducting. Accordingly, the capacitor 324 is coupled between the output terminal of the power inverter 104 and ground, and VOUT is equal to the voltage across the capacitor 324 (e.g., VIN), as shown in FIG. 4b.

FIG. 5a represents a configuration of the power inverter 104 at a second time 502. The configuration shown in FIG. 5a differs relative to that in FIG. 4a in that the switch 326 is conducting and the switch 328 is not conducting. Accordingly, the capacitor 314 is coupled in series with the capacitor 324 between the output terminal of the power inverter 104 and ground, while the blocking diode 322 effectively decouples the top plate of capacitor 324 from the top plate of capacitor 314. VOUT is equal to the sum of the voltages across the capacitors 314, 324 (e.g., 2*VIN), as shown in FIG. 5b.

FIG. 6a represents a configuration of the power inverter 104 at a third time 602. The configuration shown in FIG. 6a differs relative to that in FIG. 5a in that the switch 216 is conducting and the switch 218 is not conducting. Accordingly, the capacitor 304 is coupled in series with the capacitors 314, 324 between the output terminal of the power inverter 104 and ground, while the blocking diode 312 effectively decouples the top plate of capacitor 314 from the top plate of capacitor 304. VOUT is equal to the sum of the voltages across the capacitors 304, 314, 324 (e.g., 3*VIN), as shown in FIG. 6b.

Figures 7A, 7B:
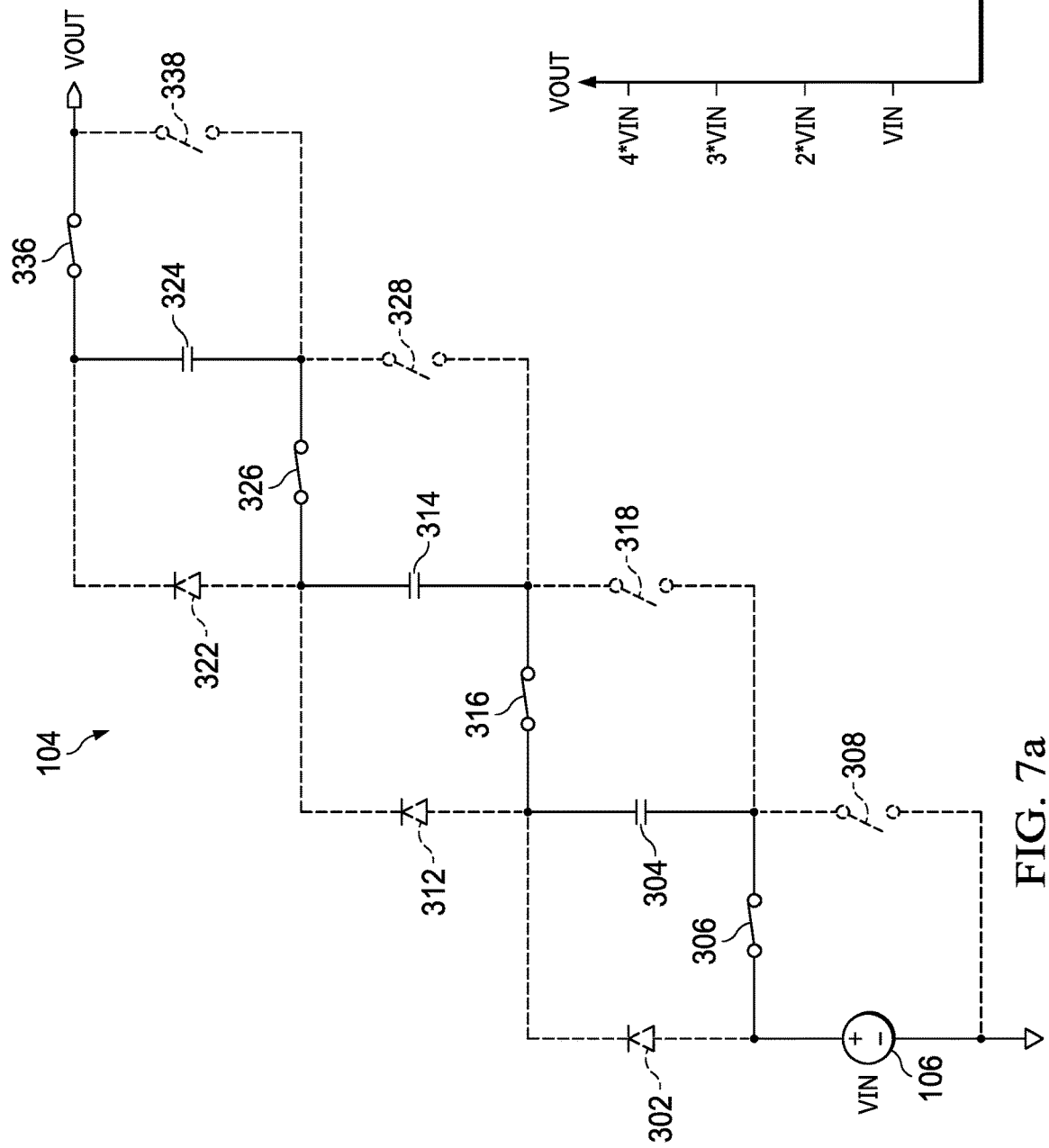
FIG. 7a is a circuit diagram of the multi-level power inverter of FIG. 3a in a fifth configuration at a fifth time.
FIG. 7b is a timing diagram of the output voltage of the power inverter through the fifth time, in an example.

Finally, FIG. 7a represents a configuration of the power inverter 104 at a fourth time 702. The configuration shown in FIG. 7a differs relative to that in FIG. 6a in that the switch 306 is conducting and the switch 308 is not conducting. Accordingly, the input voltage source 106 is also coupled in series with the capacitors 304, 314, 324 between the output terminal of the power inverter 104 and ground, while the blocking diode 302 effectively decouples the top plate of capacitor 304 from the input voltage source 106. VOUT is equal to the sum of VIN and the voltages across the capacitors 304, 314, 324 (e.g., 4*VIN), as shown in FIG. 7b.

As described above, multiple permutations exist to control the power inverter 104 to provide VOUT responsive to VIN, and the specific permutation shown in FIGS. 3a-7a is only an example. In an example, following the fourth time 702, the controller 110 causes the power inverter 104 to cycle back through the shown configurations, such as in a reverse order, to gradually step VOUT back down from 4*VIN to 0V.

For example, causing the switch 306 to stop conducting and the switch 308 to begin conducting effectively decouples the input voltage source 106 from being coupled in series with the capacitors 304, 314, 324 between the output of the power inverter 104 terminal and ground. This reduces VOUT to the voltage across the capacitors 304, 314, 324 (e.g., 3*VIN). Continuing this example, causing the switch 316 to stop conducting and the switch 318 to begin conducting effectively decouples the capacitor 304 from being coupled in series with the capacitors 314, 324 between the output of the power inverter 104 terminal and ground. This reduces VOUT to the voltage across the capacitors 314, 324 (e.g., 2*VIN). This example continues until VOUT again reaches 0V, although other permutations are within the scope of this description as well.

Figure 8:
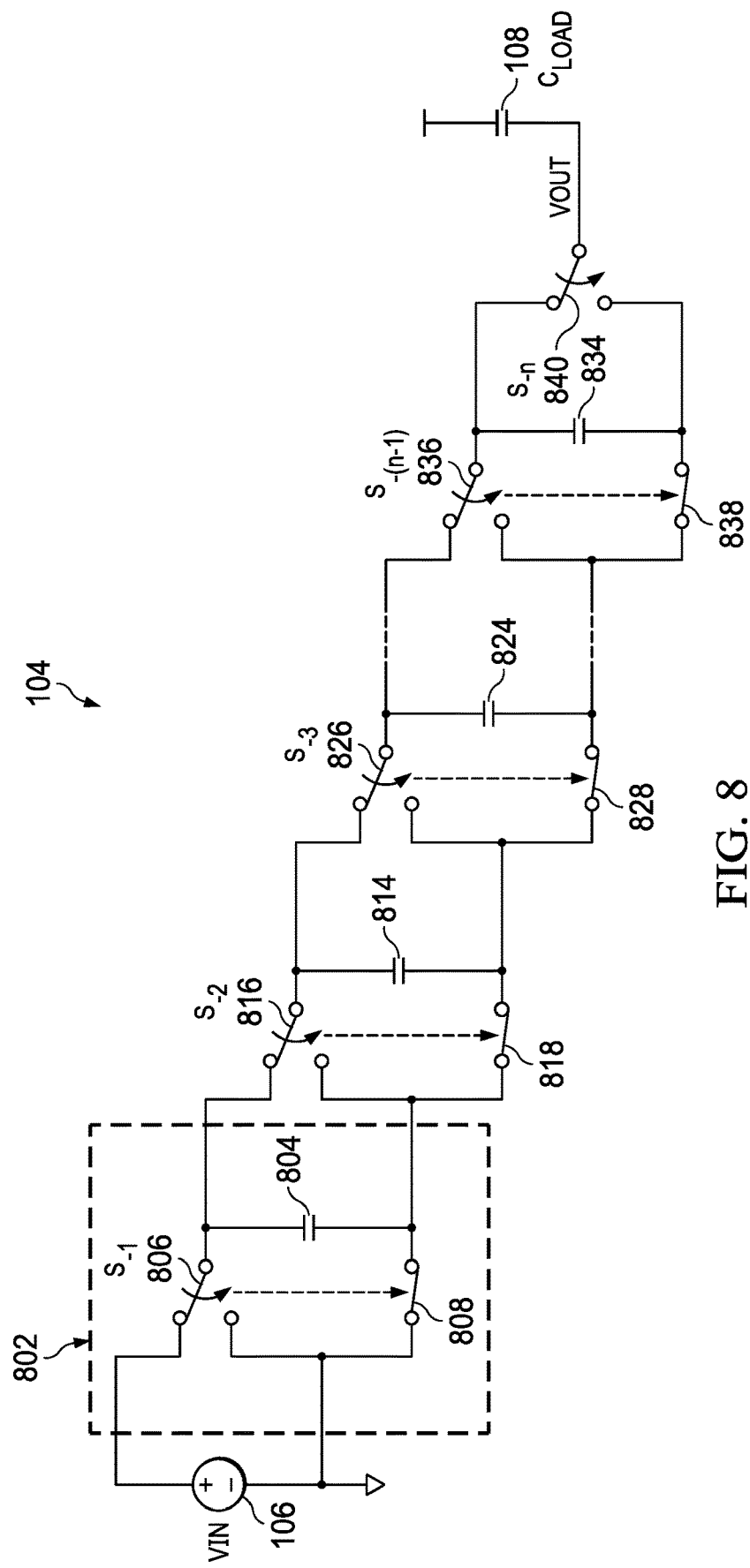
FIG. 8 is a circuit diagram of another multi-level power inverter in an example.

FIG. 8 is a circuit diagram of another example of the power inverter 104 of FIG. 1 in further detail. In the example of FIG. 8, the power inverter 104 includes multiple step-down unit cells, rather than step-up unit cells as described with respect to FIG. 2. Each step-down unit cell includes a set of input switches and a capacitor. In the specific example of FIG. 8, the power inverter 104 includes n−1 such step-down unit cells, and four such step-down unit cells are shown. However, in other examples, the power inverter 104 includes more or fewer such unit cells.

In the example of FIG. 8, a first step-down unit cell 802 includes a capacitor 804 and a set of input switches 806, 808. A top plate of capacitor 804 is coupled to the switch 806, while a bottom plate of capacitor 804 is coupled to the switch 808. The input switches 806, 808 are controlled by a signal $S_{-1}$, and operate in a synchronized manner (e.g., due to being controlled by the same signal $S_{-1}$).

In FIG. 8, the power inverter 104 also includes a second step-down unit cell including capacitor 814 and input switches 816, 818; a third step-down unit cell including capacitor 824 and input switches 826, 828; and a fourth step-down unit cell including capacitor 834 and input switches 836, 838. The input switches 816, 818 are controlled by a signal $S_{-2}$; the input switches 826, 828 are controlled by a signal $S_{-3}$; and the input switches 836, 838 are controlled by a signal $S_{-(n-1)}$. In an example, the signals $S_{-1}, S_{-2}, S_{-3}, \ldots, S_{-(n-1)}$ are binary signals that are provided by the controller 110 to the power inverter 104.

In certain examples described herein, the various input switches, with input switches 806, 808 being examples, are implemented as SPST or SPDT switches. For example, the switch 806, along with switches 816, 826, 836, are SPDT switches, and the switch 808, along with switches 818, 828, 838 are SPST switches. However, the various input switches, of which the input switches 806, 808 are examples, can include different structures to provide the functionality described herein.

In FIG. 8, the example input switches 806, 808 are in a first position (e.g., responsive to $S_{-1}$ being a first value), in which the switch 806 couples the top plate of capacitor 804 to the input voltage source 106, and the switch 808 couples the bottom plate of capacitor 804 to ground. Similarly, the input switches 816, 818 are in a first position (e.g., responsive to $S_{-2}$ being a first value), in which the switch 816 couples the top plate of capacitor 814 to the input voltage source 106, and the switch 818 couples the bottom plate of the capacitor 814 to ground. The input switches 826, 828 are also in a first position (e.g., responsive to $S_{-3}$ being a first value), in which the switch 826 couples the top plate of capacitor 824 to the input voltage source 106, and the switch 828 couples the bottom plate of the capacitor 824 to ground. The input switches 836, 838 are in a first position (e.g., responsive to $S_{-(n-1)}$ being a first value), in which the switch 836 couples the top plate of capacitor 834 to the input voltage source 106, and the switch 838 couples the bottom plate of the capacitor 834 to ground. An output switch 840 is controllable to couple either the top plate of the capacitor 834 or the bottom plate of the capacitor 834 to the load 108. Accordingly, in this example, the output switch 840 is a SPDT switch. The output switch 840 is controlled by a signal $S_{-n}$. In an example, the signal $S_{-n}$ is a binary signal that is provided by the controller 110 to the power inverter 104.

Responsive to the input switches 806, 808, 816, 818, 826, 828, 836, 838 being in the first position (e.g., responsive to the signals $S_{-1}$ to $S_{-(n-1)}$ being a first value, such as logic low), each of the capacitors 804, 814, 824, 834 is arranged in parallel with the input voltage source 106, and thus is charged to VIN. Responsive to the output switch 840 being in a first position (e.g., responsive to the signal $S_{-n}$ being a first value, such as logic low), the load 108 is coupled to the input voltage source 106 and VOUT is thus equal to VIN.

Subsequently (e.g., at a first time), one of either the output switch 240 or the sets of input switches is controlled (e.g., by the controller 110) to transition to a second position to change the voltage VOUT provided to the load 108.

In one example, the controller 110 alters the value of $S_{-n}$ at the first time (e.g., to be a second value, such as logic high) to cause the output switch 840 to couple the bottom plate of capacitor 834 (as well as the bottom plates of capacitors 824, 814, 804, and thus ground) to the load 108. Altering the value of $S_{-n}$ in this way causes the power inverter 104 to provide a ground voltage potential (e.g., 0V) to the load 108 through the output switch 240.

In another example, the controller 110 alters the value of $S_{-(n-1)}$ at the first time (e.g., to be a second value, such as logic high), the input switches 836, 838 transition to a second position, in which the SPDT switch 836 couples the top plate of capacitor 834 to the bottom plate of capacitor 824 (as well as the bottom plates of capacitors 814, 804, and thus ground). In the second position, the SPST switch 838 is open. Accordingly, the top plate of capacitor 834 is coupled to ground (e.g., through the switch 836), and is also coupled to the load 108 (e.g., through output switch 840). Altering the value of $S_{-(n-1)}$ in this way thus causes the power inverter 104 to provide the ground voltage potential (e.g., 0V), to the load 108.

In another example, the controller 110 alters the value of $S_{-3}$ at the first time (e.g., to be a second value, such as logic high) to cause the input switches 826, 828 to transition to a second position, in which the SPDT switch 826 couples the top plate of capacitor 824 (as well as the top plate of capacitor 834) to the bottom plate of capacitor 814 (as well as the bottom plate of capacitor 804, and thus ground). In the second position, the SPST switch 828 is open. Accordingly, the top plate of capacitor 824 is coupled to ground (e.g., through the switch 826), and is also coupled to the load 108 (e.g., through the switch 836 and the output switch 840). Altering the value of $S_{-3}$ in this way thus causes the power inverter 104 to provide the ground voltage potential (e.g., 0V), to the load 108.

In yet another example, the controller 110 alters the value of $S_{-2}$ at the first time (e.g., to be a second value, such as logic high) to cause the input switches 816, 818 to transition to a second position, in which the SPDT switch 816 couples the top plate of capacitor 814 (as well as the top plates of capacitors 824, 834) to the bottom plate of capacitor 804 (and thus ground). In the second position, the SPST switch 818 is open. Accordingly, the top plate of capacitor 814 is coupled to ground (e.g., through the switch 816), and is also coupled to the load 108 (e.g., through the switch 826, the switch 836, and the output switch 840). Altering the value of $S_{-2}$ in this way thus causes the power inverter 104 to provide the ground voltage potential (e.g., 0V), to the load 108.

In a further example, the controller 110 alters the value of $S_{-1}$ at the first time (e.g., to be a second value, such as logic high) to cause the input switches 806, 808 to transition to a second position, in which the SPDT switch 806 couples the top plate of capacitor 804 (as well as the top plates of capacitors 814, 824, 834) to ground. In the second position, the SPST switch 208 is open. Accordingly, the top plate of capacitor 804 is coupled to ground (e.g., through the switch 806), and is also coupled to the load 108 (e.g., through the switch 816, the switch 826, the switch 836, and the output switch 840). Altering the value of $S_{-1}$ in this way thus causes the power inverter 104 to provide the ground voltage potential (e.g., 0V), to the load 108.

As demonstrated above, multiple permutations exist to provide a first voltage (e.g., 0V) to the load 108. Examples described herein are not limited to a particular control permutation to provide a particular voltage unless explicitly stated. Accordingly, the controller 110 and the power inverter 104 are configured to provide various voltage levels to the load 108 based on a variety of different control permutations.

In the example of FIG. 8, in which the unit cells are arranged as step-down unit cells, controlling the sets of input switches causes the power inverter 104 or provide the voltage across one or more of the capacitors 804, 814, 824, 834, but with a reversed polarity (e.g., a negative voltage), to the load 108. Subsequent to the first time (e.g., at a second time), one of the sets of input switches that was not altered at the first time, or the output switch 840 if not altered at the first time, is controlled (e.g., by the controller 110) to again change the voltage VOUT provided to the load 108. In the following examples of power inverter 104 and controller 110 behavior at the second time, the controller 110 altered the value of $S_{-(n-1)}$ at the first time to cause the power inverter 104 to provide the ground voltage potential (e.g., 0V) to the load 108 through the switch 836 and the output switch 840.

In one example, the controller 110 alters the value of $S_{-n}$ at the second time to cause the output switch 840 to couple the bottom plate of capacitor 834 to the load 108. Because the top plate of capacitor 834 is coupled to the bottom plate of capacitor 824 (and thus ground) due to the previous operation of switch 836 (and switch 838) at the first time, altering the value of $S_{-n}$ in this way causes the power inverter 104 to provide the voltage across capacitor 834 with a reversed polarity (e.g., −VIN) to the load 108, through the output switch 240 and at the second time.

In another example, the controller 110 alters the value of $S_{-3}$ at the second time to cause the input switches 826, 828 to couple the top plate of capacitor 824 to the bottom plate of capacitor 814 (as well as the bottom plate of capacitor 804, and thus ground). The bottom plate of capacitor 824 is coupled to the top plate of capacitor 834 due to the previous operation of switch 836 (and switch 838) at the first time. Accordingly, the top plate of capacitor 824 is coupled to ground (e.g., through the switch 826), and the bottom plate of capacitor 824 is coupled to the load 108 (e.g., through the switch 836 and the output switch 840). Altering the value of $S_{-3}$ in this way thus causes the power inverter 104 to provide the voltage across capacitor 824 with a reversed polarity (e.g., −VIN) to the load 108.

In yet another example, the controller 110 alters the value of $S_{-2}$ at the second time to cause the input switches 816, 818 to couple the top plate of capacitor 814 (as well as the top plate of capacitor 824) to the bottom plate of capacitor 804, and thus ground. The bottom plate of capacitor 814 is coupled to the top plate of capacitor 834 due to the previous operation of switch 836 (and switch 838) at the first time. Accordingly, the top plate of capacitor 814 is coupled to ground (e.g., through the switch 816), and the bottom plate of capacitor 814 is coupled to the load 108 (e.g., through the switch 828, the switch 836, and the output switch 840). Altering the value of $S_{-2}$ in this way thus causes the power inverter 104 to provide the voltage across capacitor 814 with a reversed polarity (e.g., −VIN) to the load 108.

In still another example, the controller 110 alters the value of $S_{-1}$ at the second time to cause the input switches 806, 808 to couple the top plate of capacitor 804 (as well as the top plates of capacitors 814, 824) to ground. The bottom plate of capacitor 804 is coupled to the top plate of capacitor 834 due to the previous operation of switch 836 (and switch 838) at the first time. Accordingly, the top plate of capacitor 804 is coupled to ground (e.g., through the switch 806), and the bottom plate of capacitor 804 is coupled to the load 108 (e.g., through the switch 818, the switch 828, the switch 836, and the output switch 840). Altering the value of $S_{-1}$ in this way thus causes the power inverter 104 to provide the voltage across capacitor 804 with a reversed polarity (e.g., −VIN) to the load 108.

As demonstrated above, multiple permutations exist to provide the second voltage (e.g., −VIN) to the load 108. Examples described herein are not limited to a particular control permutation to provide a particular voltage unless explicitly stated. Accordingly, the controller 110 and the power inverter 104 are configured to provide various voltage levels to the load 108 based on a variety of different control permutations.

In the specific example of FIG. 8, in which the power inverter 104 includes four shown capacitors 804, 814, 824, 834, the power inverter 104 is configured to provide VOUT having values including ground voltage potential (e.g., 0V), VIN, −VIN, −2*VIN, . . . −4*VIN (e.g., ranging from a maximum of VIN provided by the input voltage source 106 to a minimum of −4*VIN due to the reverse polarity voltages across the four capacitors 804, 814, 824, 834 in series). Irrespective of the particular control permutation, the power inverter 104 of FIG. 8 is thus configured to provide VOUT as an AC output voltage responsive to VIN provided by the input voltage source 106 as a DC input voltage. Also, the power inverter 104 combines charge pump characteristics, such as to achieve a VOUT range that is greater than VIN, with quasi-adiabatic switching behavior to transfer energy relatively gradually (e.g., in a stepped manner) to the load 108. This increases the efficiency of the power inverter 104 and reduces intrinsic losses related to charging the capacitive load 108.

Figure 9:
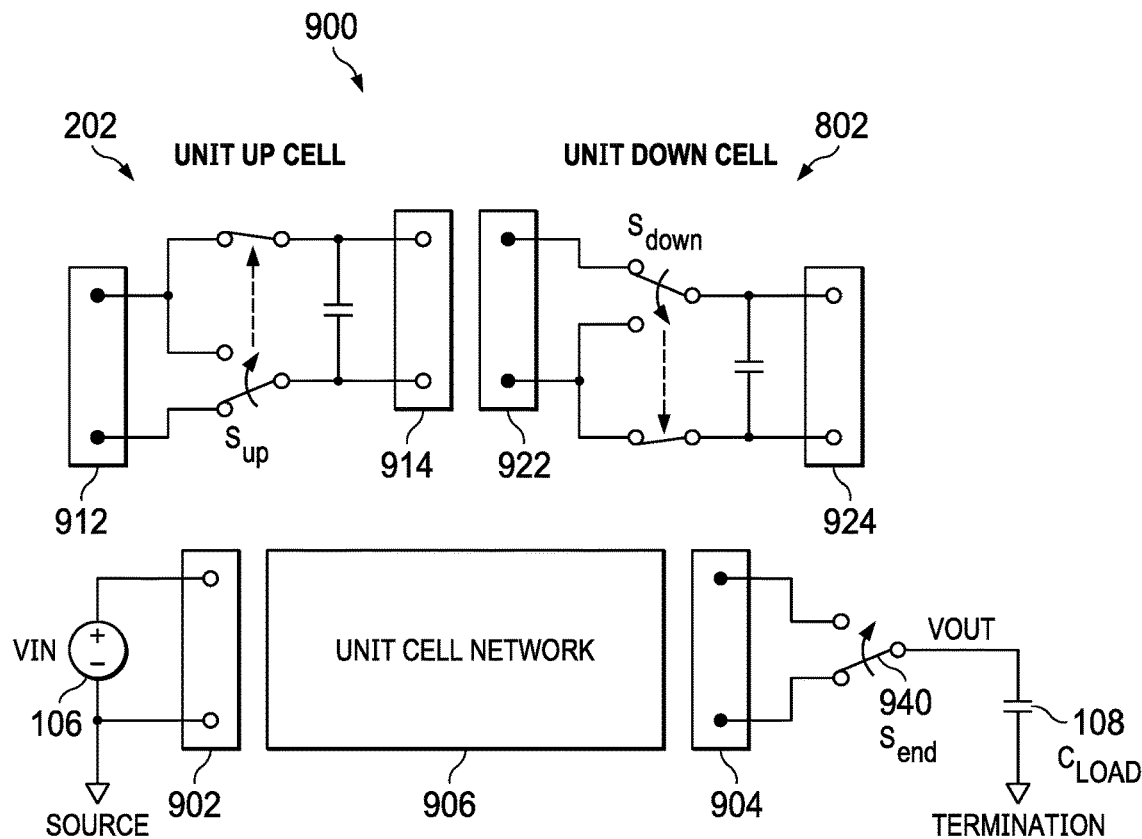
FIG. 9 is a block diagram of a multi-level power inverter including both a step-up unit cell and a step-down unit cell in an example.

FIG. 9 is a block diagram of a multi-level power inverter 900 including both a step-up unit cell and a step-down unit cell in an example. The multi-level power inverter 900 is similar in function to the power inverter 104 described above, such as with respect to FIGS. 2 and 8, but includes a combination of both step-up unit cell(s) 202 and step-down unit cell(s) 802. Both step-up unit cell(s) 202 and step-down unit cell(s) 802 enable the power inverter 900 to provide varying levels of VOUT relative to VIN. For example, the step-up unit cell 202 enables the power inverter 900 to provide VOUT greater than VIN, while the step-down unit cell 802 enables the power inverter 900 to provide VOUT less than a ground voltage potential (e.g., 0V).

In the example of FIG. 9, the power inverter 900 is schematically shown including supply terminals 902 and load terminals 904. The supply terminals 902 are adapted to be coupled to the input voltage source 106, while the load terminals 904 are adapted to be coupled to the load 108. A unit cell network 906 is arranged between (e.g., coupled to each of) the supply terminals 902 and the load terminals 904, and an output switch 940 is controllable to couple either of the load terminals 904 to the load 108 (e.g., the output switch 940 is an SPDT switch).

The unit cell network 906 includes at least one step-up unit cell 202 and at least one step-down unit cell 802. In FIG. 9, an example step-up unit cell 202 includes input terminals 912 and output terminals 914. Similarly, an example step-down unit cell 802 includes input terminals 922 and output terminals 924. The step-up unit cell 202 and the step-down unit cell 802 are otherwise arranged as described above in FIGS. 2 and 8, respectively. A signal $S_{up}$ controls the input switches of the step-up unit cell 202, a signal $S_{down}$ controls the input switches of the step-down unit cell 802, and a signal $S_{end}$ controls the output switch 940. In an example, the signals $S_{up}$, $S_{down}$, $S_{end}$ are binary signals that are provided by the controller 110 to the power inverter 900.

In a first example, the unit cell network 906 is configured such that the step-up unit cell 202 is coupled to the supply terminals 902, and the step-down unit cell 802 is coupled to the step-up unit cell 202 and to the load terminals 904. In this example, the input terminals 912 of the step-up unit cell 202 are coupled to the supply terminals 902. The input terminals 922 of the step-down unit cell 802 are thus coupled to the output terminals 914 of the step-up unit cell 202, while the output terminals 924 of the step-down unit cell 802 are coupled to the load terminals 904.

In a second example, the unit cell network 906 is configured such that the step-down unit cell 802 is coupled to the supply terminals 902, and the step-up unit cell 202 is coupled to the step-down unit cell 802 and to the load terminals 904. In this example, the input terminals 922 of the step-down unit cell 802 are coupled to the supply terminals 902. The input terminals 912 of the step-up unit cell 202 are thus coupled to the output terminals 924 of the step-down unit cell 802, while the output terminals 914 of the step-up unit cell 202 are coupled to the load terminals 904.

In other examples, the unit cell network 906 includes more than one step-up unit cell 202 and/or more than one step-down unit cell 802, which are chained together between the supply terminals 902 and the load terminals 904 of the power inverter 900 as described in the examples above. Accordingly, the power inverter 900 including the unit cell network 906 is configurable to provide various ranges of VOUT relative to VIN.

In the two specific examples of FIG. 9, in which the unit cell network 906 includes one step-up unit cell 202 and one step-down unit cell 802, the power inverter 900 is configured to provide VOUT having values including ground voltage potential (e.g., 0V), VIN, 2*VIN (e.g., provided by the input voltage source 106 plus the voltage across the step-up unit cell 202), and −VIN (e.g., provided by the voltage across the step-down unit cell 802). Irrespective of the particular control permutation, the power inverter 900 of FIG. 9 is thus configured to provide VOUT as an AC output voltage responsive to VIN provided by the input voltage source 106 as a DC input voltage. Also, the power inverter 900 combines charge pump characteristics, such as to achieve a VOUT range that is greater than VIN, with quasi-adiabatic switching behavior to transfer energy relatively gradually (e.g., in a stepped manner) to the load 108. This increases the efficiency of the power inverter 900 and reduces intrinsic losses related to charging the capacitive load 108.

Figure 10:
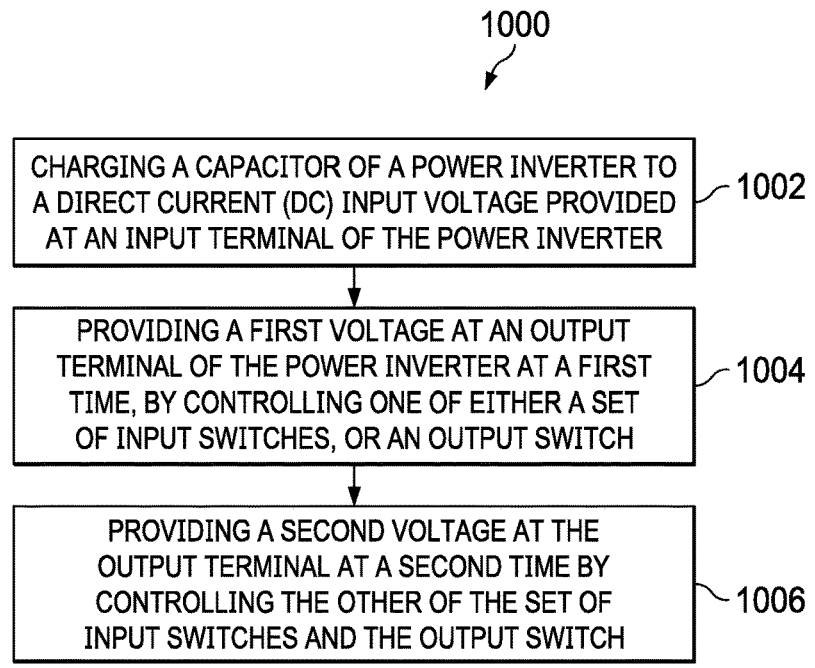
FIG. 10 is a flow chart of a method of controlling a multi-level power inverter in an example.

FIG. 10 is a flow chart of a method 1000 of controlling a multi-level power inverter. For example, the method 1000 is implemented by the controller 110 to control the power inverter 104, described above. The method 1000 begins in block 1002 with charging a capacitor of a power inverter to a direct current (DC) input voltage from an input terminal of the power inverter. For example, as described above, the capacitor 204 is charged to VIN provided by the input voltage source 106 responsive to the input switches 206, 208 being in a first position (e.g., and the capacitor 204 is in parallel with the input voltage source 106). The capacitor 204 includes first and second terminals, such as the top and bottom plates described above.

The method 1000 continues in block 1004 with providing a first voltage at an output terminal of the power inverter at a first time. The first voltage is provided by controlling one of either: an output switch that is configured to selectively couple the output terminal to either the first terminal or the second terminal; or a set of input switches that is configured to selectively couple the first and second terminals to either the input terminal or a ground terminal. As described above, the set of input switches 206, 208 includes SPST switch 206, which selectively couples the top plate of capacitor 204 to the input terminal (e.g., the input voltage source 106), and SPDT switch 208, which selectively couples the bottom plate of capacitor 204 to either the input terminal or ground. Further, the output switch 240 is a SPDT switch 240, which selectively couples the output terminal (e.g., the load 108) to either the top plate or bottom plate of the capacitor 204, such as in an example in which the power inverter 104 includes a single step-up unit cell 202.

The method 1000 continues in block 1006 with providing a second voltage at the output terminal at a second time by controlling the other of the output switch or the set of input switches. For example, if the set of input switches 206, 208 was controlled at the first time, the output switch 240 is controlled at the second time. Alternately, if the output switch 240 was controlled at the first time, the set of input switches 206, 208 is controlled at the second time.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitor, respectively, coupled in parallel between the same nodes. For example, a resistor or capacitor shown and described herein as a single component may instead be multiple resistors or capacitor, respectively, coupled in series between the same two nodes as the single resistor or capacitor.

Uses of the phrases "ground" or "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

What is claimed is:

1. A method, comprising:
at a first time:
connecting a first capacitor terminal of a first capacitor to a first terminal;
connecting a second capacitor terminal of the first capacitor to a second terminal;
connecting a third capacitor terminal of a second capacitor to the first terminal and to the first capacitor terminal;
connecting a fourth capacitor terminal of the second capacitor to the second terminal and to the second capacitor terminal;
connecting a power output to the second terminal; and
disconnecting the power output from the third capacitor terminal;
at a second time after the first time:
disconnecting the power output from the second terminal, and
connecting the power output to the third capacitor terminal;
at a third time after the first time:
disconnecting the fourth capacitor terminal from the second terminal and the second capacitor terminal; and
connecting the fourth capacitor terminal to the first capacitor terminal.

2. The method of claim 1, further comprising:
at the first time:
connecting a fifth capacitor terminal of a third capacitor to the first terminal and to the first and third capacitor terminals;
connecting a sixth capacitor terminal of the third capacitor to the second terminal and to the second and fourth capacitor terminals; and
at a fourth time after the first time:
connecting the sixth capacitor terminal to the first capacitor terminal; and
connecting the fifth capacitor terminal to the fourth capacitor terminal.

3. The method of claim 2, further comprising:
at a fifth time after the first time, connecting the second capacitor terminal to the first terminal.

4. An apparatus, comprising:
a capacitor having first and second capacitor terminals;
a first switch coupled between a first terminal and the first capacitor terminal;
a second switch having second switch terminals and a second switch control terminal, a first one of the second switch terminals coupled to the first terminal, a second one of the second switch terminals coupled to a second terminal, a third one of the second switch terminals coupled to the second capacitor terminal, the second switch configured to connect between the first one and the third one of the second switch terminals responsive to the second switch control terminal having a first state, and connect between the second one and the third one of the second switch terminals responsive to the second switch control terminal having a second state;
a third switch having third switch terminals and a third switch control terminal, a first one of the third switch terminals coupled to the first capacitor terminal, a second one of the third switch terminals coupled to the second capacitor terminal, and a third one of the third switch terminals coupled to a power output, the third switch configured to connect between the first one and the third one of the third switch terminals responsive to the third switch control terminal having a third state, and connect between the second one and the third one of the third switch terminals responsive to the third switch control terminal having a fourth state; and
a controller having control outputs coupled to the second and third switch control terminals, the controller configured to:

at a first time, set the second switch control terminal to the second state and the third switch control terminal to the fourth state; and at a second time after the first time, set the third switch control terminal to the third state.

5. The apparatus of claim 4, wherein the controller is configured to, at the second time, set the second switch control terminal to the first state.

6. The apparatus of claim 4, wherein the first switch includes a first switch control terminal coupled to the control outputs of the controller, and the controller configured to enable the first switch at the first time and disable the first switch at the second time.

7. The apparatus of claim 4, wherein the first switch includes a diode.

8. The apparatus of claim 4, wherein the capacitor is a first capacitor, and the apparatus further comprises:
a second capacitor having third and fourth capacitor terminals, the first one of the third switch terminals coupled to the third capacitor terminal, and the second one of the third switch terminals coupled to the fourth capacitor terminal;
a fourth switch coupled between the first capacitor terminal and the third capacitor terminal; and
a fifth switch having fifth switch terminals and a fifth switch control terminal, the fifth switch control terminal coupled to the control outputs, a first one of the fifth switch terminals coupled to the first capacitor terminal, a second one of the fifth switch terminals coupled to the second capacitor terminal, and a third one of the fifth switch terminals coupled to the fourth capacitor terminal and the second one of the third switch terminals, the fifth switch configured to connect between the first one and the third one of the fifth switch terminals responsive to the fifth switch control terminal having a fifth state, and connect between the second one and the third one of the fifth switch terminals responsive to the fifth switch control terminal having a sixth state.

9. The apparatus of claim 8, wherein the controller is configured to:
at the first time, set the fifth switch control terminal to the sixth state; and
at a third time after the first time, set the fifth switch control terminal to the fifth state.

10. The apparatus of claim 9, wherein the first switch includes a first switch control terminal coupled to the control outputs of the controller, the fourth switch includes a fourth switch control terminal coupled to the control outputs of the controller, and the controller is configured to enable the first and fourth switches at the first time and disable the first and fourth switches at the second time and at the third time.

11. The apparatus of claim 8, wherein each of the first and fourth switches includes a respective diode.

12. The apparatus of claim 8, wherein each of the second, third, and fifth switches includes a respective single-pole double-throw (SPDT) switch.

13. The apparatus of claim 8, wherein each of the second, third, and fifth switches includes a respective pair of complementary switches.

14. The apparatus of claim 4, wherein each of the second and third switches includes a respective single-pole double-throw (SPDT) switch.

15. The apparatus of claim 4, wherein each of the second and third switches includes a respective pair of complementary switches.

16. The apparatus of claim 4, wherein the capacitor is a first capacitor, and the apparatus further comprises:
a second capacitor having third and fourth capacitor terminals, the first one of the third switch terminals coupled to the third capacitor terminal, and the second one of the third switch terminals coupled to the fourth capacitor terminal;
a fourth switch coupled between the second capacitor terminal and the fourth capacitor terminal; and
a fifth switch having fifth switch terminals and a fifth switch control terminal, the fifth switch control terminal coupled to the control outputs, a first one of the fifth switch terminals coupled to the first capacitor terminal, a second one of the fifth switch terminals coupled to the second capacitor terminal, and a third one of the fifth switch terminals coupled to the third capacitor terminal and the first one of the third switch terminals, the fifth switch configured to connect between the first one and the third one of the fifth switch terminals responsive to the fifth switch control terminal having a fifth state, and connect between the second one and the third one of the fifth switch terminals responsive to the fifth switch control terminal having a sixth state.

17. The apparatus of claim 4, wherein the second switch includes a diode.

18. An apparatus, comprising:
a capacitor having first and second capacitor terminals;
a first switch having first switch terminals and a first switch control terminal, a first one of the first switch terminals coupled to a first terminal, a second one of the first switch terminals coupled to a second terminal, a third one of the first switch terminals coupled to the first capacitor terminal, the first switch configured to connect between the first one and the third one of the first switch terminals responsive to the first switch control terminal having a first state, and connect between the second one and the third one of the first switch terminals responsive to the first switch control terminal having a second state;
a second switch coupled between the second terminal and the second capacitor terminal;
a third switch having third switch terminals and a third switch control terminal, a first one of the third switch terminals coupled to the first capacitor terminal, a second one of the third switch terminals coupled to the second capacitor terminal, and a third one of the third switch terminals coupled to a power output, the third switch configured to connect between the first one and the third one of the third switch terminals responsive to the third switch control terminal having a third state, and connect between the second one and the third one of the third switch terminals responsive to the third switch control terminal having a fourth state; and
a controller having control outputs coupled to the first and third switch control terminals, the controller configured to:
at a first time, set the first switch control terminal to the first state and the third switch control terminal to the third state; and
at a second time after the first time, set the third switch control terminal to the fourth state.

19. The apparatus of claim 18, wherein the capacitor is a first capacitor, and the apparatus further comprises:
a second capacitor having third and fourth capacitor terminals, the first one of the third switch terminals coupled to the third capacitor terminal, and the second one of the third switch terminals coupled to the fourth capacitor terminal;

a fourth switch coupled between the second capacitor terminal and the fourth capacitor terminal; and a fifth switch having fifth switch terminals and a fifth switch control terminal, the fifth switch control terminal coupled to the control outputs, a first one of the fifth switch terminals coupled to the first capacitor terminal, a second one of the fifth switch terminals coupled to the second capacitor terminal, and a third one of the fifth switch terminals coupled to the third capacitor terminal and the first one of the third switch terminals, the fifth switch configured to connect between the first one and the third one of the fifth switch terminals responsive to the fifth switch control terminal having a fifth state, and connect between the second one and the third one of the fifth switch terminals responsive to the fifth switch control terminal having a sixth state.

20. The apparatus of claim 18, wherein the capacitor is a first capacitor, and the apparatus further comprises:

a second capacitor having third and fourth capacitor terminals, the first one of the third switch terminals coupled to the third capacitor terminal, and the second one of the third switch terminals coupled to the fourth capacitor terminal;

a fourth switch coupled between the first capacitor terminal and the third capacitor terminal; and a fifth switch having fifth switch terminals and a fifth switch control terminal, the fifth switch control terminal coupled to the control outputs, a first one of the fifth switch terminals coupled to the first capacitor terminal, a second one of the fifth switch terminals coupled to the second capacitor terminal, and a third one of the fifth switch terminals coupled to the fourth capacitor terminal and the second one of the third switch terminals, the fifth switch configured to connect between the first one and the third one of the fifth switch terminals responsive to the fifth switch control terminal having a fifth state, and connect between the second one and the third one of the fifth switch terminals responsive to the fifth switch control terminal having a sixth state.

21. The apparatus of claim 18, wherein the controller is configured to, at the second time, set the first switch control terminal to the second state.

22. The apparatus of claim 18, wherein the second switch includes a second switch control terminal coupled to the control outputs of the controller, and the controller is configured to enable the second switch at the first time and disable the second switch at the second time.

23. A method comprising:
at a first time:
connecting a first capacitor terminal of a first capacitor to a first terminal;
connecting a second capacitor terminal of the first capacitor to a second terminal;
connecting a third capacitor terminal of a second capacitor to the first terminal and to the first capacitor terminal;
connecting a fourth capacitor terminal of the second capacitor to the second terminal and to the second capacitor terminal;
connecting a power output to the first capacitor terminal; and
disconnecting the power output from the second capacitor terminal;
at a second time after the first time:
disconnecting the power output from the first terminal; and
connecting the power output to the fourth capacitor terminal; and
at a third time after the first time:
disconnecting the fourth capacitor terminal from the second terminal and the second capacitor terminal; and
connecting the third capacitor terminal to the second capacitor terminal.

24. The method of claim 23, further comprising:
at the first time:
connecting a fifth capacitor terminal of a third capacitor to the first terminal and to the first and third capacitor terminals;
connecting a sixth capacitor terminal of the third capacitor to the second terminal and to the second and fourth capacitor terminals; and
at a fourth time after the first time:
connecting the sixth capacitor terminal to the third capacitor terminal; and
connecting the fifth capacitor terminal to the second capacitor terminal.

25. The method of claim 24, further comprising:
at a fifth time after the first time, connecting the first capacitor terminal to the second terminal.

* * * * *